US008743850B2

(12) United States Patent
Cordeiro

(10) Patent No.: US 8,743,850 B2
(45) Date of Patent: Jun. 3, 2014

(54) WIRELESS COMMUNICATION STATION AND METHODS FOR COMMUNICATING STATION-CAPABILITY INFORMATION

(71) Applicant: Carlos Cordeiro, Portland, OR (US)

(72) Inventor: Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/627,330

(22) Filed: Sep. 26, 2012

(65) Prior Publication Data

US 2013/0021975 A1 Jan. 24, 2013

Related U.S. Application Data

(63) Continuation of application No. 12/969,954, filed on Dec. 16, 2010.

(51) Int. Cl.
*H04W 4/00* (2009.01)

(52) U.S. Cl.
USPC ........................................................ 370/338

(58) Field of Classification Search
USPC ......... 370/311, 252, 328, 329, 254, 217, 338, 370/347, 336, 349, 331, 342, 345, 395.64
See application file for complete search history.

(56) References Cited

U.S. PATENT DOCUMENTS

| 2006/0165035 | A1 | 7/2006 | Chandra et al. | |
|---|---|---|---|---|
| 2007/0286140 | A1* | 12/2007 | Kwon | 370/338 |
| 2008/0247371 | A1* | 10/2008 | Kwon et al. | 370/338 |
| 2010/0074097 | A1* | 3/2010 | Jeon et al. | 370/217 |
| 2011/0182174 | A1* | 7/2011 | Pi et al. | 370/229 |
| 2012/0155443 | A1 | 6/2012 | Cordeiro | |

FOREIGN PATENT DOCUMENTS

| CN | 103348757 A | 10/2013 |
|---|---|---|
| KR | 2008009095 A | 10/2008 |
| KR | 20100064249 A | 6/2012 |
| WO | WO-2012082733 A2 | 6/2012 |
| WO | WO-2012082733 A3 | 6/2012 |

OTHER PUBLICATIONS

"International Application Serial No. PCT/US2011/064633, International Search Report mailed Jul. 31, 2012", 5 pgs.
"International Application Serial No. PCT/US2011/064633, Written Opinion mailed Jul. 31, 2012", 4 pgs.
"Application U.S. Appl. No. 12/969,954, Non Final Office Action mailed Feb. 28, 2013", 14 pgs.
"U.S. Appl. No. 12/969,954, Final Office Action mailed Jun. 10, 2013", 19 pgs.
"U.S. Appl. No. 12/969,954, Response filed May 22, 2013 to Non Final Office Action mailed Feb. 28, 2013", 13 pgs.
"International Application Serial No. PCT/US2011/064633, International Preliminary Report on Patentability mailed Jun. 27, 2013", 6 pgs.

\* cited by examiner

*Primary Examiner* — Dady Chery
(74) *Attorney, Agent, or Firm* — John F. Travis

(57) ABSTRACT

Embodiments of a wireless communication station and methods for communication station-capability information are generally described herein. In some embodiments, a first wireless communications station is configured to wirelessly communicate a station-capability information element (IE). The station-capability IE included in at least one item selected from a list of items consisting of an association between the first station and a second station, an information-request action frame, and an information-response action frame.

24 Claims, 5 Drawing Sheets mmWAVE BSS

COMMUNICATIONS BETWEEN NON-PCP STATIONS

STATION-CAPABILITY INFORMATION ELEMENT

| ORDER | INFORMATION |
|---|---|
| 501 — 1 | CATEGORY |
| 502 — 2 | ACTION |
| 503 — 3 | TARGET ADDRESS |
| 504 — 4 | REQUEST IE |
| 505 — 5 | STA CAPABILITY 1 (OPTIONAL) |
| 505 — ... | ... |
| 505 — N+4 | STA CAPABILITY N (OPTIONAL) |
| 506 — N+5 | IE PROVIDED 1 (OPTIONAL) |
| 506 — ... | ... |
| 506 — 4+N+M | IE PROVIDED M (OPTIONAL) |
| 507 — LAST | VENDOR SPECIFIC |

PCP INFORMATION–REQUEST ACTION FRAME

*FIG. 5*

| ORDER | INFORMATION |
|---|---|
| 601 — 1 | CATEGORY |
| 602 — 2 | ACTION |
| 603 — 3 | TARGET ADDRESS |
| 605 — 4 | STA CAPABILITY 1 |
| 605 — ... | ... |
| 605 — N+2 | STA CAPABILITY N (OPTIONAL) |
| 604 — N+3 | REQUEST IE |
| 606 — N+4 | IE PROVIDED 1 (OPTIONAL) |
| 606 — ... | ... |
| 606 — 3+N+M | IE PROVIDED M (OPTIONAL) |
| 607 — LAST | VENDOR SPECIFIC |

INFORMATION-RESPONSE FRAME

*FIG. 6*

WIRELESS COMMUNICATION STATION AND METHODS FOR COMMUNICATING STATION-CAPABILITY INFORMATION

This application is a continuation of U.S. patent application Ser. No. 12/969,954, filed on Dec. 16, 2010, which is incorporated herein by reference in its entirety.

TECHNICAL FIELD

Embodiments pertain to communication networks. Some embodiments pertain to wireless personal area networks (WPANs) and wireless local area networks (WLANs) that use millimeter-wave frequencies to communicate. Some embodiments relate to millimeter-wave networks operating in accordance with the wireless gigabit alliance (WiGig) specification and the IEEE 802.11ad specification for very-high throughput in 60 GHz. Some embodiments relate to millimeter-wave networks that operate in accordance with IEEE 802.15.3 specification for high-rate WPANs.

BACKGROUND

The millimeter-wave band has the available spectrum and is capable of providing significantly higher-level throughputs than the microwave frequency band. Due to significantly higher attenuation levels and the directional nature of millimeter-wave signals, millimeter-wave devices (i.e., stations) generally employ highly-directional antennas as well as beamforming techniques for communicating. Some key usages of the millimeter-wave frequency band may include transmissions to a wireless display, wireless docking, sync & go, real-time video streaming, and high-definition television (HDTV) streaming, among others. To enable these key usages, millimeter-wave devices may need to discover each other and exchange capability and service information. This is more difficult in a millimeter-wave network due to the need for highly-directional antennas and beamforming techniques.

Thus, there are general needs for millimeter-wave stations and methods for station and information discovery in a millimeter-wave network. What is also needed is a simplified and unified frame-format scheme for both station and information discovery suitable for use in a millimeter-wave WPAN or in a millimeter-wave WLAN.

BRIEF DESCRIPTION OF THE DRAWINGS

FIG. 5 illustrates an information-request action frame, in accordance with some embodiments;

FIG. 6 illustrates an information-response action frame, in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
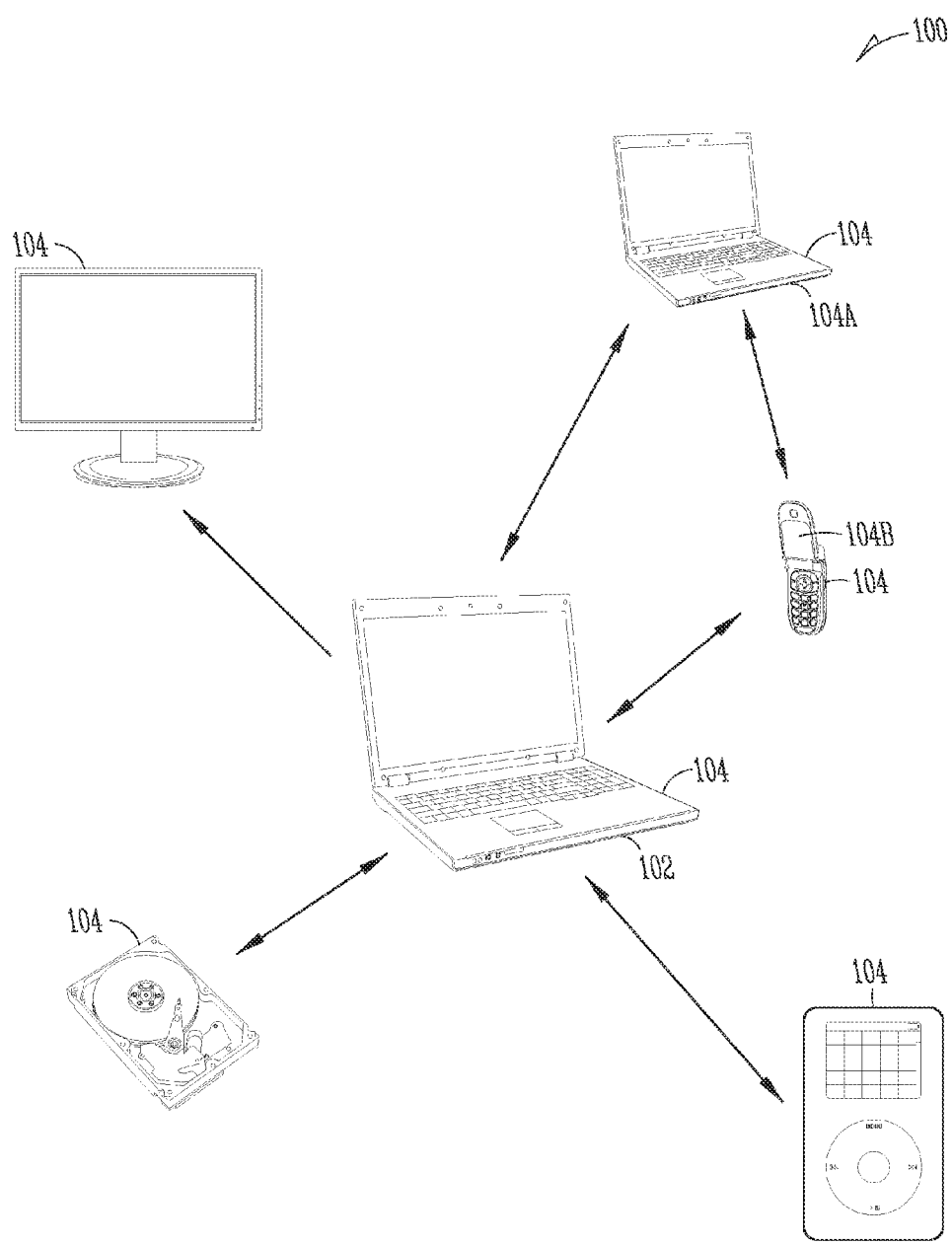
FIG. 1 illustrates a millimeter-wave (mm basic-service set (BSS), in accordance with some embodiments.

FIG. 1 illustrates a mmW BSS, in accordance with some embodiments. The mmW BSS 100 includes a plurality of mmW stations 104 that may communicate using millimeter waves. One of the mmW stations 104, the central coordinator 102, may operate as central coordinator for the mmW BSS 100 to coordinate communications among the mmW stations 104 and control access to the wireless medium.

In some embodiments, the central coordinator 102 may broadcast a beacon frame that indicates the length of a beacon interval during which communications are to take place. The beacon frame may be received by the other mmW stations 104, thereby allowing the other mmW stations 104 to know when the next beacon interval will occur. The central coordinator 102 and the mmW stations 104 may utilize directional antennas and may employ beamforming, beam steering or beam directing techniques to communicate therebetween. These embodiments are described in more detail below.

In accordance with some embodiments, a simplified and unified frame-format scheme for both station and information discovery is provided. The frame-format scheme may be suitable for use in both a mmW WPAN and a mmW WLAN. As described in more detail below, through the use of a station-capability information element, an information-request action frame, and an information-response action frame, the mmW stations 104 of the mmW BSS 100 may be able to discover each other and exchange station-capability information so that non-central coordinator devices, such as mmW station 104A and mmW station 104B, can communicate directly in a peer-to-peer (P2P) manner.

In some embodiments, the central coordinator 102 and the mmW stations 104 are configured to operate as part of a personal BSS (PBSS). The central coordinator 102 may be a PBSS control point (PCP) operating as a central coordinator for the PBSS, and the PBSS may be configured to operate in accordance with a Wireless Gigabit Alliance (WiGig or WGA) specification or an IEEE 802.11 specification such as the Task Group ad (IEEE 802.11ad) draft specification for multi-gigabit speed wireless communications technology operating over an unlicensed 60 GHz frequency band. The PBSS may be configured to operate in accordance with the WiGig Media-Access Control (MAC) or Physical Layer (PHY) specifications, version 1.0 or later, although this is not a requirement. In some other embodiments, the PBSS may be configured to operate in accordance with an IEEE 802.15.3 specification for high-rate WPANs, including the IEEE 802.15.3 Task Group 3c (TG3c).

In some embodiments, the central coordinator 102 and the mmW stations 104 comprise an infrastructure BSS (IBSS). The central coordinator 102 may be an access point (AP) operating as a central coordinator for the IBSS. The IBSS may be configured to operate in accordance with the WiGig specification or the IEEE 802.11ad specification referenced above.

The mmW stations 104 may include wireless display devices, laptop and portable computers, mobile communication devices (e.g., cell phones, smart phones or personal digital assistant (PDAs)), hard drives and other storage devices, digital audio players (e.g., MP3 players), web tablets, wireless headsets, pagers and instant messaging devices, digital cameras, televisions, medical devices (e.g., a heart rate monitor, a blood pressure monitor, etc.), or other device that may receive and/or transmit information using millimeter waves.

Through the use of the frame-format scheme described herein, the mmW stations 104 may discover each other and exchange station-capability information, which may allow for P2P communications therebetween. For example, wireless docking and sync & go techniques for a laptop computer may be achieved. Furthermore, a laptop computer will be able to determine that a wireless display device is indeed a display and not a wireless hard drive, for example, which will allow for wireless use of the display by the laptop computer. A cell phone may be able to discover and determine the capabilities of an MP3 player so that it can synchronize music files with the MP3 player. The mmW stations 104 associated with a laptop (which may be operating as the central coordinator 102) may be able to discover, each other, learn each other's capabilities, and subsequently establish wireless connections therebetween.

In a conventional WLAN or WiFi network configured in accordance with conventional IEEE 802.11 specifications, station and service discovery are less important since WEAN devices use microwave frequencies (which are less directional the mmW frequencies) and because WLAN devices are generally configured to communicate directly with an access point.

Figure 2:
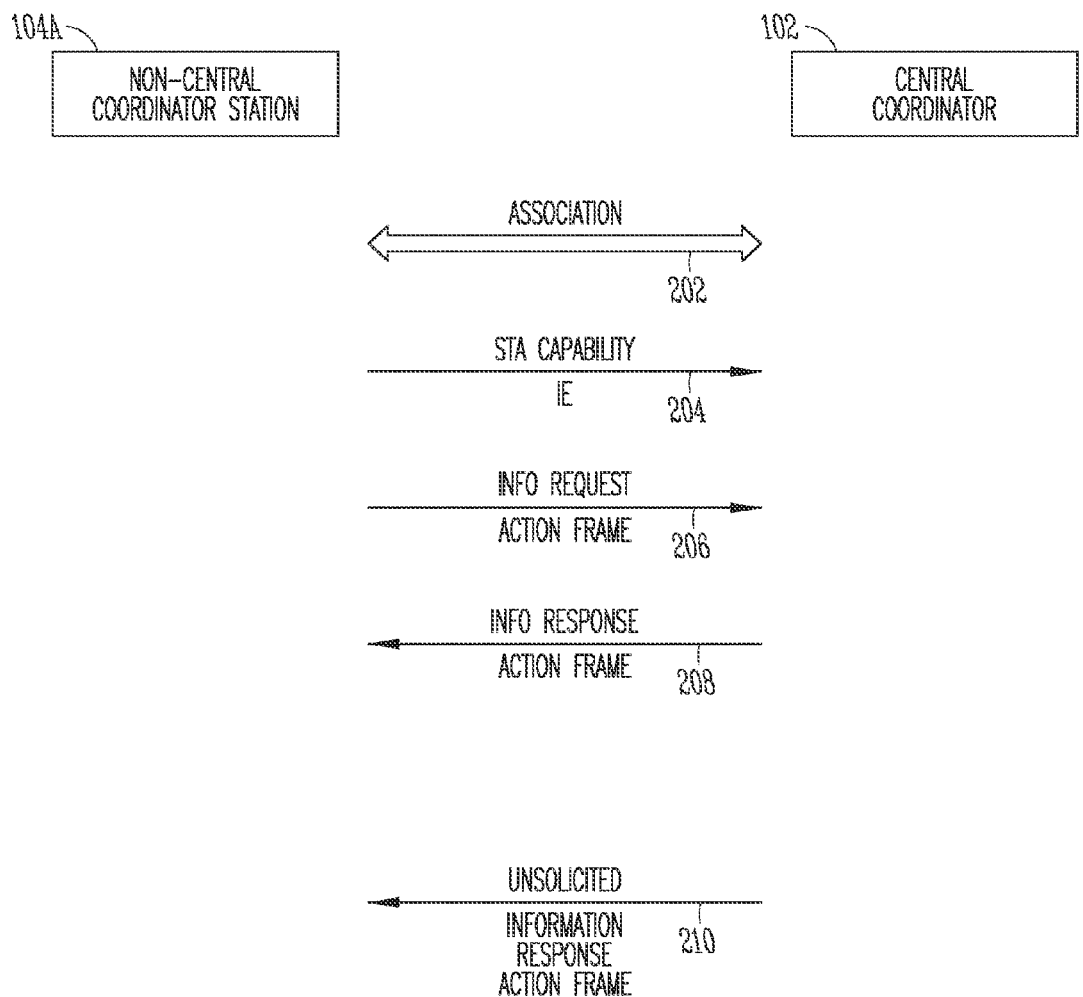
FIG. 2 illustrates communications between the central coordinator and a non-central coordinator station, in accordance with some embodiments.

FIG. 2 illustrates communications between a central coordinator 102 and anon-central coordinator station 104A, in accordance with some embodiments. A non-central coordinator station, such as mmW station 104A (FIG. 1A), may be configured to transmit a station-capability IE 204 to the central coordinator 102 during association 202 with the BSS 100 (FIG. 1). The station-capability IE 204 may be configured to provide station-capability information to the central coordinator 102. The non-central coordinator station 104A may also be configured to transmit an information-request action frame 206 to a target station to either discover or request information about the one or more other mmW stations 104 (FIG. 1) of the BSS 100. The target station may be either the central coordinator 102 (as illustrated in FIG. 2) or one of the other mmW stations (e.g., non-central coordinator station 104B (FIG. 1)). The non-central coordinator station 104A may receive an information-response action frame 208 from the target station (e.g., the central coordinator 102) that includes the requested information.

In some embodiments, an unsolicited information-response action frame 210 may be sent unsolicited (i.e., not in response to an information-request action frame 206) by one of the mmW stations 104, such as by the central coordinator 102, to provide updated information to the mmW stations 104 of the BSS 100. In some of these embodiments, the unsolicited information-response action frame 210 may be transmitted by the central coordinator 102 to the associated mmW stations 104 upon association of a new mmW station 104 with the BSS 100 or upon disassociation of a mmW station 104 with the BSS 100. The unsolicited information-response action frame 210 may include station-capability information of all currently associated mmW stations 104 and may include the station-capability information of the central coordinator 102. An unsolicited information-response action frame 210 may also be sent at any time by the central coordinator 102.

In these embodiments, the transmission of the unsolicited information-response action frame 210 by the central coordinator 102 to all mmW stations 104 associated with BSS 100 allows currently associated mmW stations 104 to maintain up-to-date information about the other currently associated mmW stations 104. An unsolicited information-response action frame 210 may also be sent by a non-central coordinator station 104 to provide an information update directly to one or more other non-central coordinator stations 104 in the BSS 100.

As described in more detail below, the station-capability information provided in the station-capability IE 204, requested and/or provided in the information-request action frame 206, or provided in the information-response action frame 208 allows a mmW station 104 to know the capabilities of other mmW stations 104. The station-capability information may include one or more of beamforming capabilities, the number of antennas and antenna capabilities, the number of elements per antenna, supported modulations and modulation capabilities, supported channels, and multi-user (MU) multiple-input output (MIMO) capabilities, among other things. This exchange of information may allow any non-central coordinator station 104 to subsequently perform beamforming training for subsequent communication therebetween.

Figure 3:
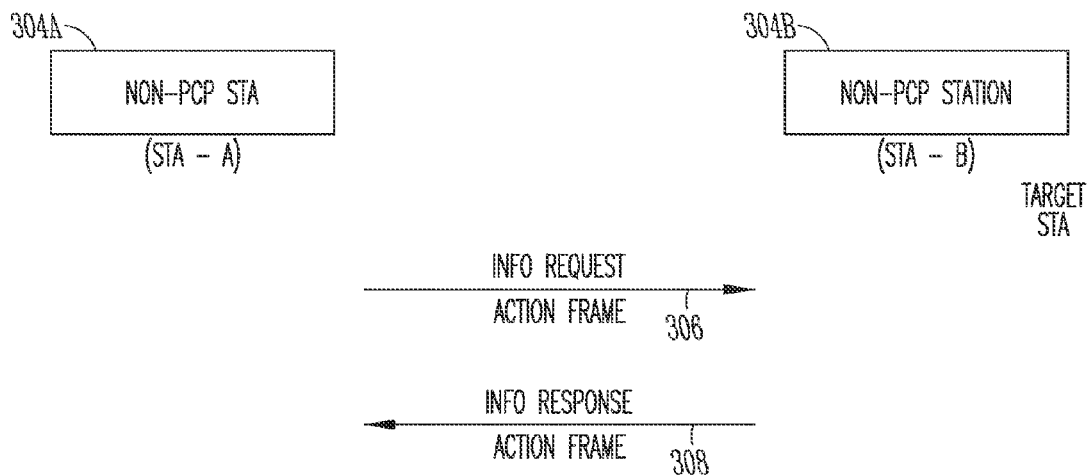
FIG. 3 illustrates communications between two non-central coordinator stations, in accordance with some embodiments.

FIG. 3 illustrates communications between two non-central coordinator stations, in accordance with some embodiments. An initiating non-central coordinator station 304A may transmit an information-request action frame 306 to another non-central coordinator station 304B to either discover or request information about the other the other non-central coordinator station 304B. The other non-central coordinator station 304B may be configured to respond by transmitting an information-response action frame 308 that includes the requested information. In some embodiments, the initiating non-central coordinator station 304A may transmit the information-request action frame 306 to the other non-central coordinator station 304B after the initiating non-central coordinator station 304A has received station-capability information about the other non-central coordinator station 304B from the central coordinator 102 (FIG. 1), although this is not a requirement.

The initiating non-central coordinator station 304A may correspond to non-central coordinator station 104A (FIG. 1) and the other non-central coordinator station 304B may correspond to non-central coordinator station 1049 (FIG. 1).

Figure 4:
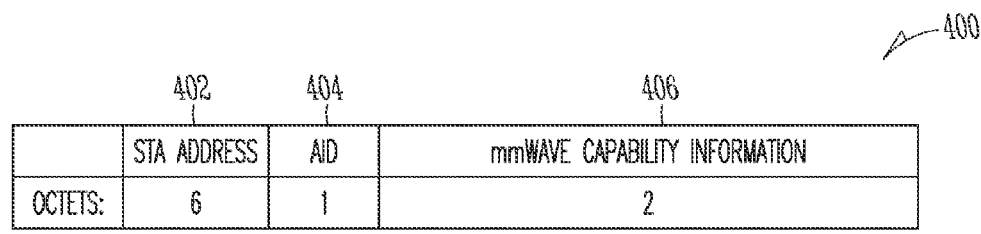
FIG. 4 illustrates a station-capability information element (IE), in accordance with some embodiments.

FIG. 4 illustrates a station-capability IE, in accordance with some embodiments. Station-capability IE 400 may be suitable for use as station-capability IE 204 (FIG. 2) and may be transmitted from one mmW station 104 (FIG. 1) to another mmW station 104 to provide station-capability information to the other mmW station 104. In some embodiments, the station-capability IE 400 may be transmitted by a mmW station 104 to the central coordinator 102 (FIG. 1) during association 202 (FIG. 2) with the BSS 100 (FIG. 1) to provide station-capability information to the central coordinator 102.

In some embodiments, one or more station-capability FE 400 may be included as part of the information-request action frame 206 (FIG. 2) or the information-request action frame 306 (FIG. 3) to provide station-capability information within the frame. One or more station-capability IE 400 may also be included as part of the information-response action frame 208 (FIG. 2) or the information-response action frame 308 (FIG. 3) to provide station-capability information within the frame.

In accordance with some embodiments, the station-capability if 400 may include a station (STA) address 402 of the sending mmW station (e.g., mmW station 104A (FIG. 1)), an association identifier (AID) 404 of the sending mmW station, and station-capability information 406 of the sending mmW station. The station address 402 may be a MAC address of the sending mmW station, and the association ID 404 may have been assigned by the central coordinator 102 during association 202. The station-capability information 406 may include station-capability information of the sending mmW station and may include at least some basic capabilities of the sending mmW station. As discussed in more detail below, the information included in the station-capability IE 400 may be distributed by the central coordinator 102 in an information-response action frame 208 (FIG. 2) when requested or in an unsolicited information-response action frame 210 (FIG. 2).

FIG. 5 illustrates an information-request action frame 500, in accordance with some embodiments. Information-request action frame 500 may be suitable for use as information-request action frame 206 (FIG. 2) and information-request action frame 306 (FIG. 3). In some embodiments, a sending mmW station, such as non-central coordinator station 104A (FIG. 1), may transmit the information-request action frame 500 to a target station to either discover or request information about the one or more other mmW stations 104 (FIG. 1) in the BSS 100 (FIG. 1). The target station may be either the central coordinator 102 (FIG. 1) or one of the other mmW stations (e.g., non-central coordinator station 104B).

In some embodiments, the information-request action frame 500 may also include station-capability information of the sending mmW station. The sending mmW station may also configure the information-request action frame 500 to include station-capability information of other mmW stations 104 that are known to the sending mmW station, in addition to the station-capability information of the sending mmW station. The information-request action frame 500 may allow the sending mmW station to either discover other mmW stations 104 or request information about the one or more other mmW stations 104 of the BSS 100.

In some embodiments, the information-request action frame 500 includes at least a target address field 503 and a request IE field 504. The target address field 503 may include an address of the target station, and the request IE field 504 may be configured to indicate the types of information elements that the sending mmW station is requesting from the target station (e.g., either the central coordinator 102 or a non-central coordinator station such as mmW station 104B).

When the information-request action frame 500 is transmitted to the central coordinator 102 (as illustrated in FIG. 2) and when the target address field 503 includes a broadcast address, the sending mmW station may be requesting information about all the other mmW stations 104 that are associated with the central coordinator 102. The request IE field 504 may allow the sending mmW station to specify which types of IEs are being requested from the target station. In some embodiments, almost any type of IE may be requested in the request IE field 504.

As further illustrated in FIG. 5, the information-request action frame 500 may also include a category field 501 to indicate that the information-request action frame 500 is a frame applicable to a mmW BSS, and an action field 502 to indicate that information-request action frame 500 is requesting information. In some embodiments, category field 501, action field 502, and request IE field 504 may be configured in accordance with section 7.3.2.12 of the IEEE 802.11ad specification, although this is not a requirement.

When the information-request action frame 500 is transmitted to another non-central coordinator station, such as non-central coordinator station 304B (as illustrated in FIG. 3), the target address field 503 may include a MAC address of the other non-central coordinator station 104B indicating that the sending mmW station is requesting information about the other non-central coordinator station 104B directly from the other non-central coordinator station 104B. Accordingly, peer non-central coordinator stations may discover each other and request information about each other. Furthermore, this exchange of information may allow direct-link setup (DLS) performed between peer non-central coordinator stations.

Accordingly, an information-request action frame 500 may be used by a mmW station 104 to request information about either a single station in the BSS 100 or about all of the associated mmW stations 104 in the BSS 100. If a mmW station 104 is requesting information about only a single mmW station 104 in the BSS 100 (FIG. 1), the requesting station may set the target address field 503 in the frame to the MAC address of that single mmW station 104. If a mmW station 104 is requesting information about all of the mmW stations 104 in the BSS 100, it may set the target address field 503 in the frame to the broadcast address and may transmit the information-request action frame 500 to the central coordinator 102.

In some embodiments, the information-request action frame 500 may also include a station-capability field 505 that includes station-capability information about the sending mmW station (i.e., the source station) and station-capability information about other mmW stations 104 that are known to the sending mmW station. The information-request action frame 500 may also include an optional IE-provided field 506 that includes an actual IE that the sending mmW station is providing to the target station. In these embodiments, an information-request action frame 500 may provide the capabilities and any other IEs of the sending mmW station (i.e., the source station). This reduces the number of handshakes between the two mmW stations 104.

As illustrated in FIG. 5, a station-capability field 505 may be included in the information-request action frame 500 for each mmW station for which station-capability information is being provided. As also illustrated in FIG. 5, an IE-provided field 506 may also be provided for each IE that is provided. As also illustrated in FIG. 5, one or more vendor-specific IE 507 may also be included in the information-request action frame 500. Accordingly, a simplified and unified frame-format scheme for both station and information discovery suitable for use in a mmW WPAN or a mmW WLAN is provided.

FIG. 6 illustrates an information-response action frame 600, in accordance with some embodiments. The information-response action frame 600 may be suitable for use as information-response action frame 208 (FIG. 2) or information-response action frame 308 (FIG. 3). The information-response action frame 600 may transmitted by a mmW station either unsolicited or in response to receipt of the information-request action frame 500 (FIG. 5). When the information-response action frame 600 is sent in response to an information-request action frame 500, it may be referred to as a solicited information-response action frame because it was requested by another mmW station. When the information-response action frame 600 is not sent in response to an information-request action frame 500, it may be referred to as an unsolicited information-response action frame 210 (FIG. 2).

In accordance with the embodiments illustrated in FIG. 6, the information-response action frame 600 may include a target address field 603 and a request IE field 604. The target address field 603 may include an address of a target station (i.e., that station that is to receive the information-response action frame 600) when the information-response action frame 600 is solicited. The target address field 603 may include a broadcast address when the information-response action frame 600 is unsolicited.

The request IE field 60.4 may be configured to indicate the types of information elements that are being provided in the information-response action frame 600. The information-response action frame 600 may also include one or more optional station capability fields 605 to indicate station capability of one or more mmW stations 104. The information-response action frame 600 may also include one or more optional IE-provided fields 606 to include the actual information elements that the mmW station 104 transmitting the information-response action frame 600 is providing to the mmW station 104 receiving the information-response action frame 600. As also illustrated in FIG. 6, the information-response action frame 600 may also include a category field 601, an action field 602, and one or more vendor-specific fields 607, similar to fields 501, 502 and 507, respectively, as discussed above.

Figure 7:
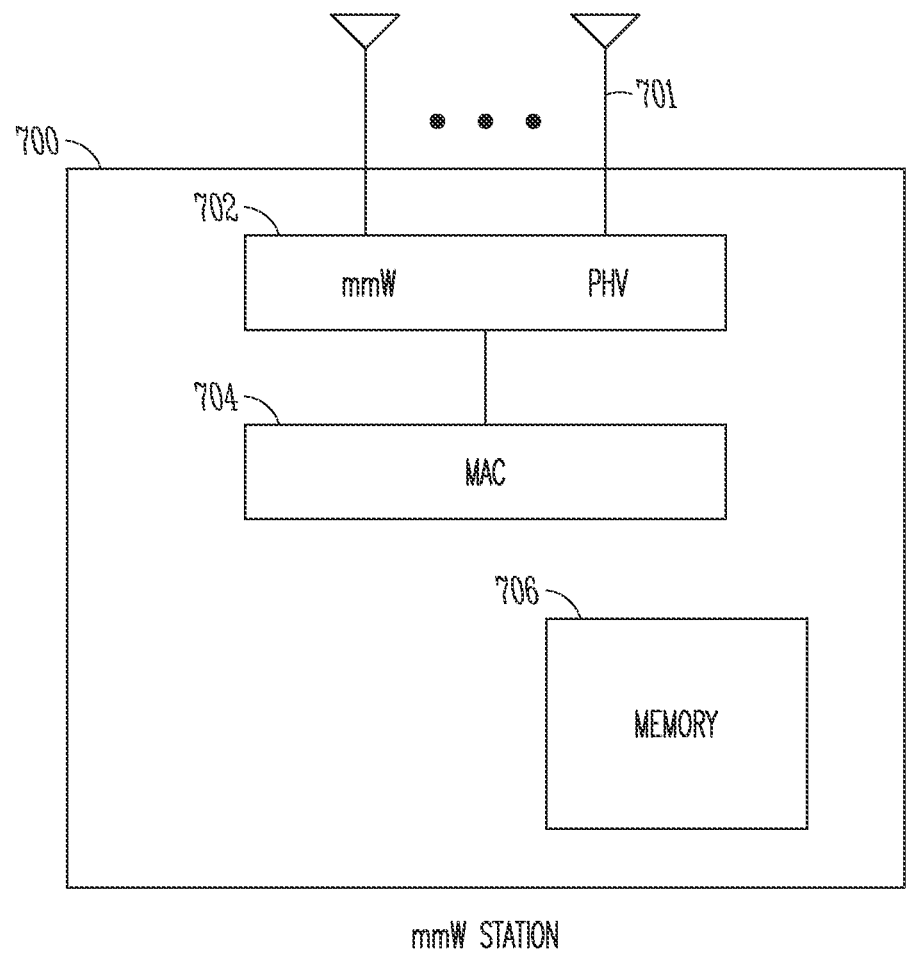
FIG. 7 illustrates a functional block diagram of a millimeter-wave station, in accordance with some embodiments.

FIG. 7 illustrates a functional block diagram of a mmW station 700, in accordance with some embodiments. The mmW station 700 may be suitable for use as any one of mmW stations 104 (FIG. 1), including the central coordinator 102 (FIG. 1). The mmW station 700 may include one or more antennas 701 that may be configured for communicating millimeter wave signals either in a directional manner or in a non-directional manner. In accordance with embodiments, the mmW station 700 may configure the antennas 701 for non-directional communications for establishing an initial contact with another mmW station, and may configure the antennas 701 for directional communications after establishing an initial contact with the other mmW station. In these embodiments, station-capability information received from the other station or received from the central coordinator 102 may be used for the directional communications. In some embodiments, beam-forming training may be performed and beamforming coefficients may be employed for the directional communications.

The mmW station 700 may include mmW PHY layer 702, MAC layer 704, and memory 706. In some embodiments, the mmW station 700 may implement the mmW PHY layer 702 and the MAC layer 704 in accordance with a WiGig PEW and MAC specifications (or the IEEE 802.11ad specification) for multi-gigabit speed wireless communications technology operating over the unlicensed 60 GHz frequency band. Memory 706 may be configured to store, among other things, the station-capability information received from other mmW stations for use in communicating with the other mmW stations.

Although mmW station 700 is illustrated as having several separate functional elements, one or more of the functional elements may be combined and may be implemented by combinations of software-configured elements, such as processing elements including digital signal processors (DSPs) and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of mmW station 700 may refer to one or more processes operating on one or more processing elements.

Antennas 701 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some MIMO embodiments, antennas 701 may be effectively separated to take advantage of spatial diversity and the different channel characteristics that may result between each of antennas 701 and the antennas of a sending mmW station. In some MIMO embodiments, antennas 701 may be separated by up to $\frac{1}{10}$ of a wavelength or more.

In some embodiments, the mmW station 700 may be configured to perform association beam-forming training (A-BFT) with collision avoidance, in accordance with U.S. patent application Ser. No. 12/559,770, filed Sep. 15, 2009, entitled "MILLIMETER-WAVE COMMUNICATION STATION AND METHOD FOR SCHEDULING ASSOCIATION BEAMFORMING TRAINING WITH COLLISION AVOIDANCE," In some embodiments, the mmW station 700 may be configured to perform multiple-access beamforming and beamforming training in accordance with U.S. patent application Ser. No. 12/574,140, filed Oct. 6, 2009 entitled "MILLIMETER-WAVE COMMUNICATION STATION AND METHOD FOR MULTIPLE-ACCESS BEAMFORMING IN A MILLIMETER-WAVE COMMUNICATION NETWORK."

Referring to FIGS. 1-6, in accordance with some embodiments, the mmW stations 104 and the central coordinator 102 may implement a set of protocol procedures. For example, a sending mmW station 104 may transmit an information-request action frame 500 to a destination station 104 in the BSS 100 with a length field of the request IE 504 set to zero to determine if the destination mmW station is still present in the BSS 100 and is within range of the sending mmW station 104.

A sending mmW station 104, such as non-central coordinator station 104A, may transmit an information-request action frame 500 that includes its station-capability information element 400 and other information elements. However, a sending mmW station 104, such as non-central coordinator station 104A, may be prohibited from including the station-capability information of another station within an information-request action frame 500.

As discussed above, a sending mmW station 104 may transmit an information-response action frame 600 either as a response to an information-request action frame 500, or it may be sent unsolicited. If the sending mmW station 104 is providing information about a single other mmW station of the BSS 100, the sending mmW station 104 may set the target address field 603 in information-response action frame 600 to a MAC address of that single other mmW station. If a sending mmW station 104 is providing information about all of the stations in the BSS 100 in the information-response action frame 600, it may set the target address field 603 in information-response action frame 600 to the broadcast address.

In accordance with some embodiments, a responding station 104 (either a station 104 or the central coordinator 102) may be configured to include, an information-response action frame 600, the information elements that were requested by the station requesting the information. A responding station (either a station 104 or the central coordinator 102) may also be configured to send an information-response action frame 600 with an empty payload in response to a received information-request action frame 500 for which the requesting mmW station solicits information about a single station that is not a member of the BSS 100 and the responding station is the central coordinator 102 (or that is not the responding station itself). Otherwise, the responding station may send an information-response action frame 600 with the information requested by the requesting station.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transistor mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A first wireless communications station configured to:
    wirelessly communicate to at least a second wireless communications station a station-capability information element (IE) that includes information identifying capabilities of the first wireless communications station and a station address of the first wireless communications station, the station-capability IE included in at least one of:
    an association request frame provided during association of the first wireless communications station,
    an information-request action frame specifying requested information from the at least second wireless communications station when the first wireless communications station initiates communication with the at least second wireless communications station, and
    an information-response action frame, wherein the information-response action frame includes station-capability information of the first wireless communications station when sent by the first wireless communications station in response to the information-request action frame from the at least second wireless communications station.

2. The first station of claim 1, wherein the station-capability IE includes an association identifier (AID) of the first wireless communications station, and the station-capability information about the first wireless communications station.

3. The first station of claim 2, wherein the station-capability information includes at least one item selected from a list of items consisting of:
    beamforming capabilities,
    number of antennas,
    number of elements per antenna,
    supported modulations,
    supported channels, and
    multi-user multiple-input multiple-output (MU MIMO) capabilities.

4. The first station of claim 1, wherein the information-request action frame includes the at least second wireless communications station address field indicating the at least second wireless communications station, and a request IE field indicating types of information elements that the first wireless communications station is requesting from the at least second wireless communications station.

5. The first station of claim 4, wherein when the information-request action frame further includes one or more station-capability fields indicating station-capability information about one or more wireless communications stations.

6. The first station of claim 4, wherein the information-request action frame further includes one or more IE provided fields containing station-capability IEs for one or more wireless communications stations.

7. The first station of claim 1, wherein the information-response action frame includes the first wireless communications station address field indicating the first wireless communications station and one or more station-capability fields indicating station-capability information about one or more wireless communications stations.

8. The first station of claim 1, wherein the information-response action frame further includes one or more IE provided fields containing station-capability TEs for one or more wireless communications stations.

9. At least one computer-readable non--transitory storage medium that contains instructions, which when executed by one or more processors result in performing operations comprising:
    wirelessly communicating to at least a second wireless communications station a station-capability information element (IE) that includes information identifying capabilities of a first wireless communications station and a station address of the first wireless communications station, the station-capability IF included in at least one of:
    an association request frame provided during association of the first wireless communications station,
    an information-request action frame specifying requested information from the at least second wireless communications station when the first wireless communications station initiates communication with the at least second wireless communications station, and
    an information-response action frame, wherein the information-response action frame includes station-capability information of the first wireless communications station when sent by the first wireless communications station in response to the information-request action frame from the at least second wireless communications station.

10. The storage medium of claim 9, wherein the station-capability IE includes an association identifier (AID) of the first wireless communications station, and the station-capability information about the first wireless communications station.

11. The storage medium of claim 10, wherein the station-capability information includes at least one item selected from a list of items consisting of:
    beamforming capabilities,
    number of antennas,
    number of elements per antenna,
    supported modulations,
    supported channels, and
    multi-user multiple-input multiple-output (MU MIMO) capabilities.

12. The storage medium of claim 9, wherein the information-request action frame includes the at least second wireless communications station address field indicating the at least second wireless communications station, and a request IE field indicating types of information elements that the first wireless communications station is requesting from the at least second wireless communications station.

13. The storage medium of claim 12, wherein when the information-request action frame further includes one or more station-capability fields indicating station-capability information about one or more wireless communications stations.

14. The storage medium of claim 12, wherein the information-request action frame further includes one or more Hi provided fields containing station-capability IEs for one or more wireless communications stations.

15. The storage medium of claim 9, wherein the information-response action frame includes one or more station-capability fields indicating station-capability information about one or more wireless communications stations.

16. The storage medium of claim 9, wherein the information-response action frame further includes one or more IE provided fields containing station-capability IEs for one or more wireless communications stations.

17. A method of communicating in a wireless network, comprising:
- wirelessly communicating to at least a second wireless communications station a station-capability information element (IE) that includes information identifying capabilities of a first wireless communications station and a station address of the first wireless communications station, the station-capability IE included in at least one of:
- an association request frame provided during association of the first wireless communications station,
- an information-request action frame specifying requested information from the at least second wireless communications station when the first wireless communications station initiates communication with the at least second wireless communications station, and
- an information-response action frame, wherein the information-response action frame includes station-capability information of the first wireless communications station when sent by the first wireless communications station in response to the information-request action frame from the at least second wireless communications station.

18. The method of clam 17, wherein the station-capability IE includes an association identifier (AID) of the first wireless communications station, and the station-capability information about the first wireless communications station.

19. The method of claim 18, wherein the station-capability information includes at least one item selected from a list of items consisting of:
- beamforming capabilities,
- number of antennas,
- number of elements per antenna,
- supported modulations,
- supported channels, and
- multi-user multiple-input multiple-output (MU MIMO) capabilities.

20. The method of claim 17, wherein the information-request action frame includes the at least second wireless communications station address field indicating the at least second wireless communications station, and a request IE field indicating types of information elements that the first wireless communications station is requesting from the at least second wireless communications station.

21. The method of claim 20, wherein when the information-request action frame further includes one or more station-capability fields indicating station-capability information about one or more wireless communications stations.

22. The method of claim 20, wherein the information-request action frame further includes one or more IE provided fields containing station-capability IEs for one or more wireless communications stations.

23. The method of claim 17, wherein the information-response action frame includes one or more station-capability fields indicating station-capability information about one or more wireless communications stations.

24. The method of claim 17, wherein the information-response action frame further includes one or more IE provided fields containing station-capability IEs for one or more wireless communications stations.

* * * * *